United States Patent
Nehl et al.

(10) Patent No.: US 7,024,946 B2
(45) Date of Patent: Apr. 11, 2006

(54) ASSEMBLY FOR MEASURING MOVEMENT OF AND A TORQUE APPLIED TO A SHAFT

(75) Inventors: Thomas Wolfgang Nehl, Shelby Township, MI (US); Thomas Hubert Van Steenkiste, Ray, MI (US); John R. Smith, Birmingham, MI (US); Brian K Fuller, Rochester Hills, MI (US); Avoki M. Omekanda, Rochester, MI (US); Donald T. Morelli, White Lake, MI (US); Joseph V. Mantese, Shelby Twp, MI (US)

(73) Assignee: Delphi Technologies, Inc., Troy, MI (US)

( * ) Notice: Subject to any disclaimer, the term of this patent is extended or adjusted under 35 U.S.C. 154(b) by 99 days.

(21) Appl. No.: 10/763,499

(22) Filed: Jan. 23, 2004

(65) Prior Publication Data

US 2005/0160834 A1 Jul. 28, 2005

(51) Int. Cl.
*G01L 3/10* (2006.01)
(52) U.S. Cl. .............................. 73/862.333; 73/862.335
(58) Field of Classification Search ........... 73/862.333, 73/862.336, 862.23, 862.332, 862.335
See application file for complete search history.

(56) References Cited

U.S. PATENT DOCUMENTS

| | | | |
|---|---|---|---|
| 2,861,900 A | 11/1958 | Smith et al. | |
| 3,100,724 A | 8/1963 | Rocheville | |
| 3,876,456 A | 4/1975 | Ford et al. | |
| 3,993,411 A | 11/1976 | Babcock et al. | |
| 3,996,398 A | 12/1976 | Manfredi | |
| 4,263,335 A | 4/1981 | Wagner et al. | |
| 4,416,421 A | 11/1983 | Browning et al. | |
| 4,606,495 A | 8/1986 | Stewart, Jr. et al. | |
| 4,891,275 A | 1/1990 | Knoll | |
| 4,939,022 A | 7/1990 | Palanisamy | |

(Continued)

FOREIGN PATENT DOCUMENTS

DE 42 36 911 12/1993

(Continued)

OTHER PUBLICATIONS

Dykhuizen, et al.; *Gas Dynamic Principles of Cold Spray*; Journal of Thermal Spray Technology; Jun. 1998; pp. 205-212.

(Continued)

*Primary Examiner*—Max Noori
*Assistant Examiner*—Jermaine Jenkins
(74) *Attorney, Agent, or Firm*—Scott A. McBain

(57) ABSTRACT

The subject invention provides an assembly for measuring movement of and a torque applied to a shaft extending between first and second ends and being hollow, specifically for measuring rotation and twisting of the shaft. A permanent magnet is disposed within the shaft for producing a parallel magnetic field emanating radially from the shaft. A sensor mechanism is positioned adjacent the shaft to detect the magnetic flux produced in response to the shaft being moved. The sensor mechanism includes a magnetostrictive (MR) material disposed annularly about the shaft and extends between first and second edges. A flux collector extends beyond the first and second edges of the magnetostrictive material to direct the magnetic flux through a Hall sensor to detect an axial component of the magnetic flux in response to twisting. A positional ring extends annularly around and spaced from the shaft and a positional sensor is disposed between the positional ring and the shaft for measuring a radial component of the magnetic flux in response to rotating.

48 Claims, 5 Drawing Sheets

U.S. PATENT DOCUMENTS

| | | | |
|---|---|---|---|
| 5,146,790 A * | 9/1992 | Fish | 73/862.336 |
| 5,157,966 A * | 10/1992 | Lugosi et al. | 73/118.1 |
| 5,187,021 A | 2/1993 | Vydra et al. | |
| 5,217,746 A | 6/1993 | Lenling et al. | |
| 5,271,965 A | 12/1993 | Browning | |
| 5,302,414 A | 4/1994 | Alkhimov et al. | |
| 5,308,463 A | 5/1994 | Hoffmann et al. | |
| 5,328,751 A | 7/1994 | Komorita et al. | |
| 5,340,015 A | 8/1994 | Hira et al. | |
| 5,362,523 A | 11/1994 | Gorynin et al. | |
| 5,395,679 A | 3/1995 | Myers et al. | |
| 5,424,101 A | 6/1995 | Atkins et al. | |
| 5,464,146 A | 11/1995 | Zalvzec et al. | |
| 5,465,627 A | 11/1995 | Garshelis | |
| 5,476,725 A | 12/1995 | Papich et al. | |
| 5,493,921 A | 2/1996 | Alasafi | |
| 5,520,059 A | 5/1996 | Garshelis | |
| 5,525,570 A | 6/1996 | Chakraborty et al. | |
| 5,527,627 A | 6/1996 | Lautzenhiser et al. | |
| 5,585,574 A | 12/1996 | Sugihara et al. | |
| 5,593,740 A | 1/1997 | Strumbon et al. | |
| 5,648,123 A | 7/1997 | Kuhn et al. | |
| 5,683,615 A | 11/1997 | Munoz | |
| 5,706,572 A | 1/1998 | Garshelis | |
| 5,708,216 A | 1/1998 | Garshelis | |
| 5,725,023 A | 3/1998 | Padula | |
| 5,795,626 A | 8/1998 | Grabel et al. | |
| 5,854,966 A | 12/1998 | Kampe et al. | |
| 5,875,830 A | 3/1999 | Singer et al. | |
| 5,887,335 A | 3/1999 | Garshelis | |
| 5,889,215 A | 3/1999 | Kilmartin et al. | |
| 5,894,054 A | 4/1999 | Poruchuri et al. | |
| 5,907,105 A | 5/1999 | Pinkerton | |
| 5,907,761 A | 5/1999 | Tohma et al. | |
| 5,952,056 A | 9/1999 | Jordan et al. | |
| 5,965,193 A | 10/1999 | Ning et al. | |
| 5,989,310 A | 11/1999 | Chu et al. | |
| 5,993,565 A | 11/1999 | Pinkerton | |
| 6,033,622 A | 3/2000 | Maruyama | |
| 6,047,605 A | 4/2000 | Garshelis | |
| 6,051,045 A | 4/2000 | Narula et al. | |
| 6,051,277 A | 4/2000 | Claussen et al. | |
| 6,074,737 A | 6/2000 | Jordan et al. | |
| 6,098,741 A | 8/2000 | Gluf | |
| 6,119,667 A | 9/2000 | Boyer et al. | |
| 6,129,948 A | 10/2000 | Plummet et al. | |
| 6,139,913 A | 10/2000 | Van Steenkiste et al. | |
| 6,145,387 A | 11/2000 | Garshelis | |
| 6,149,736 A | 11/2000 | Sukigara | |
| 6,159,430 A | 12/2000 | Foster | |
| 6,189,663 B1 | 2/2001 | Smith et al. | |
| 6,260,423 B1 | 7/2001 | Garshelis | |
| 6,261,703 B1 | 7/2001 | Sasaki et al. | |
| 6,283,386 B1 | 9/2001 | Van Steenkiste et al. | |
| 6,283,859 B1 | 9/2001 | Carlson et al. | |
| 6,289,748 B1 | 9/2001 | Lin et al. | |
| 6,338,827 B1 | 1/2002 | Nelson et al. | |
| 6,344,237 B1 | 2/2002 | Kilmer et al. | |
| 6,374,664 B1 | 4/2002 | Bauer | |
| 6,402,050 B1 | 6/2002 | Kashirin et al. | |
| 6,422,360 B1 | 7/2002 | Oliver et al. | |
| 6,424,896 B1 | 7/2002 | Lin | |
| 6,442,039 B1 | 8/2002 | Schreiber | |
| 6,446,857 B1 | 9/2002 | Kent et al. | |
| 6,465,039 B1 | 10/2002 | Pinkerton et al. | |
| 6,485,852 B1 | 11/2002 | Miller et al. | |
| 6,488,115 B1 | 12/2002 | Ozsoylu | |
| 6,490,934 B1 | 12/2002 | Garshelis | |
| 6,511,135 B1 | 1/2003 | Ballinger et al. | |
| 6,537,507 B1 | 3/2003 | Nelson et al. | |
| 6,551,734 B1 | 4/2003 | Simpkins et al. | |
| 6,553,847 B1 | 4/2003 | Garshelis | |
| 6,615,488 B1 | 9/2003 | Anders | |
| 6,623,704 B1 | 9/2003 | Roth | |
| 6,623,796 B1 | 9/2003 | VanSteenkiste et al. | |
| 2002/0071906 A1 | 6/2002 | Rusch | |
| 2002/0073982 A1 | 6/2002 | Shaikh et al. | |
| 2002/0102360 A1 | 8/2002 | Subramanian et al. | |
| 2002/0110682 A1 | 8/2002 | Brogan et al. | |
| 2002/0112549 A1 | 8/2002 | Cheshmehdoost et al. | |
| 2002/0182311 A1 | 12/2002 | Leonardi et al. | |
| 2003/0039856 A1 | 2/2003 | Gillispie et al. | |
| 2003/0190414 A1 | 10/2003 | VanSteenkiste | |
| 2003/0219542 A1 | 11/2003 | Ewasyshyn et al. | |

FOREIGN PATENT DOCUMENTS

| | | |
|---|---|---|
| DE | 199 59 515 | 6/2001 |
| DE | 100 37 212 | 1/2002 |
| DE | 101 26 100 | 12/2002 |
| EP | 1 160 348 | 12/2001 |
| EP | 1245854 A2 | 2/2002 |
| JP | 55031161 | 3/1980 |
| JP | 61249541 | 11/1986 |
| JP | 04180770 | 6/1992 |
| JP | 04243524 | 8/1992 |
| WO | 98/22639 | 5/1998 |
| WO | 02/052064 | 1/2002 |
| WO | 03009934 | 2/2003 |

OTHER PUBLICATIONS

McCune, et al; *An Exploration of the Cold Gas-Dynamic Spray Method for Several Materials Systems*.

Ibrahim, et al; *Particulate Reinforced Metal Matrix Composites—A Review*; Journal of Materials Science 26; pp. 1137-1156.

I.J. Garshelis, et al; *A Magnetoelastic Torque Transducer Utilizing a Ring Divided into Two Oppositely Polarized Circumferential Regions*; MMM 1995; Paper No. BB-08.

I.J. Garshelis, et al; *Development of a Non-Contact Torque Transducer for Electric Power Steering Systems*; SAE Paper No. 920707; 1992; pp. 173-182.

Boley, et al; *The Effects of Heat Treatment on the Magnetic Behavior of Ring—Type Magnetoelastic Torque Sensors*; Proceedings of Sicon '01; Nov. 2001.

J.E. Snyder, et al; *Low Coercivity Magnetostrictive Material with Giant Piezomagnetic d33*, Abstract Submitted for the MAR99 Meeting of the American Physical Society.

McCune, et al; *An Exploration of the Cold Gas-Dynamic Spray Method . . .* ; Proc. Nat. Thermal Spray Conf. ASM Sep. 1995.

Pavel Ripka, et al; *Pulse Excitation of Micro-Fluxgate Sensors*, IEEE Transactions on Magnetics, vol. 37, No. 4, Jul. 2001, pp. 1998-2000.

Trifon M. Liakopoulos, et al; *Ultrahigh Resolution DC Magnetic Field Measurements Using Microfabricated Fluxgate Sensor Chips*, University of Cincinnati, Ohio, Center for Microelectronic Sensors and MEMS, Dept. of ECECS pp. 630-631.

Derac Son, *A New Type of Fluxgate Magnetometer Using Apparent Coercive Field Strength Measurement*, IEEE Transactions on Magnetics, vol. 25, No. 5, Sep. 1989, pp. 3420-3422.

O. Dezauri, et al; *Printed Circuit Board Integrated Fluxgate Sensor*, Elsevier Science S. A. (2000) Sensors and Actuators, pp. 200-203.

How, et al; *Generation of High-Order Harmonics in Insulator Magnetic Fluxgate Sensor Cores*, IEEE Transactions on Magnetics, vol. 37, No. 4, Jul. 2001, pp. 2448-2450.

Moreland, *Fluxgate Magnetometer*, Carl W. Moreland, 199-2000, pp. 1-9.

Ripka, et al; *Symmetrical Core Improves Micro-Fluxgate Sensors*, Sensors and Acutuators, Version 1, Aug. 25, 2000, pp. 1-9.

Hoton How, et al; *Development of High-Sensitivity Fluxgate Magnetometer Using Single-Crystal Yttrium Iron Garnet Thick Film as the Core Material*, ElectroMagnnetic Applications, Inc.

Ripka, et al; *Microfluxgate Sensor with Closed Core*, submitted for Sensors and Actuators, Version 1, Jun. 17, 2000.

Henriksen, et al; *Digital Detection and Feedback Fluxgate Magnetometer*, Meas. Sci. Technol. 7 (1996) pp. 897-903.

Cetek 930580 Compass Sensor, *Specifications*, Jun. 1997.

Geyger, *Basic Principles Characteristics and Applications*, Magnetic Amplifier Circuits, 1954, pp. 219-232.

Van Steenkiste, et al; *Kinetic Spray Coatings*; in Surface & Coatings Technology III; 1999; pp. 62-71.

Liu, et al: *Recent Development in the Fabrication of Metal Matrix-Particulate Composites Using Powder Metallurgy Techniques*; in Journal of Material Science 29; 1994; pp. 1999-2007; National University of Singapore, Japan.

Papyrio; *The Cold Gas-Dynamic Spraying Method a New Method for Coatings Deposition Promises a New Generation of Technologies*; Novosibirsk, Russia.

McCune, al; Characterization of Copper and Steel Coatings Made by the Cold Gas-Dynamic Spray Method; National Thermal Spray Conference.

Alkhimov, et al; *A Method of "Cold" Gas-Dynamic Deposition*; Sov. Phys. Kokl. 36(12; Dec. 1990; pp. 1047-1049.

Dykuizen, et al; *Impact of High Velocity Cold Spray Particles*; in Journal of Thermal Spray Technology 8(4); 1999; pp. 559-564.

Swartz, et al: *Thermal Resistance At Interfaces: Appl. Phys. Lett.*, vol. 51, No. 26,28: Dec. 1987; pp. 2201-2202.

Davis, et al; *Thermal Conductivity of Metal-Matrix Composlites*; J.Appl. Phys. 77 (10), May 15, 1995; pp. 4494-4960.

Stoner et al; *Measurements of the Kapitza Conductance between Diamond and Several Metals*; Physical Review Letters, vol. 68, No. 10; Mar. 9, 1992; pp. 1563-1566.

Stoner et al; *Kapitza conductance and heat flow between solids at temperatures from 50 to 300K* Physical Review B, vol. 48, No. 22, Dec. 1, 1993-II; pp. 16374;16387.

Johnson et al; *Diamond/Al metal matrix composites formed by the pressureless metal infiltration process*; J. Mater, Res., vol. 8, No. 5, May 1993; pp. 11691173.

Rajan et al; *Reinforcement coatings and interfaces in Aluminium Metal Matrix Composites*; pp. 3491-3503.

*LEC Manufacturing and Engineering Capabilities*; Lanxide Electronic Components, Inc.

Dykhuizen et al; *Gas Dynamic Principles of Cold Spray*; Journal of Thermal Spray Technology; Jun. 1998; pp. 205-212.

McCune et al; *An Exploration of the Cold Gas-Dynamic Spray Method For Several Materials Systems*.

Ibrahim et al; *Particulate Reinforced Metal Matrix Composites—A Review*; Journal of Matrials Science 26: pp. 1137-1156.

European Search Report dated Jan. 29, 2004 and it's Annex.

\* cited by examiner $$\overline{B}(\theta) = Bm\,COS\theta\,\overline{a}_R$$

ASSEMBLY FOR MEASURING MOVEMENT OF AND A TORQUE APPLIED TO A SHAFT

BACKGROUND OF THE INVENTION

1) Field of the Invention

The subject invention relates to an assembly for measuring movement of a shaft and for measuring a magnetic flux transmitted through the shaft as a result of a torque applied thereto.

2) Description of Related Art

In systems having rotating drive shafts it is sometimes necessary to know the torque, position, and speed of these shafts in order to control the same or other devices associated with the rotatable shafts. Accordingly, it is desirable to sense and measure the torque applied to these items and their positions in an accurate, reliable and inexpensive manner. Sensors to measure the torque imposed on rotating shafts, such as but not limited to shafts in vehicles, are used in many applications. For example, it might be desirable to measure the torque on rotating shafts in a vehicle's transmission, or in a vehicle's engine (e.g., the crankshaft), or in a vehicle's automatic braking system (ABS) for a variety of purposes known in the art.

One application of this type of torque measurement is in electric power steering systems wherein an electric motor is driven in response to the operation and/or manipulation of a vehicle steering wheel. The system then interprets the amount of torque or rotation applied to the steering wheel and its attached shaft in order to translate the information into an appropriate command for an operating means of the steerable wheels of the vehicle.

Prior methods for obtaining torque measurement in such systems were accomplished through the use of contact-type sensors directly attached to the shaft being rotated. For example, one such type of sensor is a "strain gauge" type torque detection apparatus, in which one or more strain gauges are directly attached to the outer peripheral surface of the shaft and the applied torque is measured by detecting a change in resistance, which is caused by applied strain and is measured by a bridge circuit or other well-known means.

Another type of sensor used is a non-contact torque sensor. These non-contact torque sensors have a magnetostrictive (MR) material, or coating material, disposed on rotating shafts and sensors are positioned to detect the presence of an external flux which is the result of a torque being applied to the magnetostrictive material. Such magnetostrictive materials require an inherent magnetic field within the material which is typically produced or provided by pre-stressing. Forces are applied (e.g., compressive or tensile forces) to pre-stress the coating prior to magnetization of the pre-stressed coating in order to provide the desired magnetic field. Alternatively, an external magnet or magnets are provided to produce the same or a similar result to the magnetostrictive material. To this end, magnetostrictive torque sensors have been provided wherein a sensor is positioned in a surrounding relationship with a rotating shaft, with an air gap being established between the sensor and shaft to allow the shaft to rotate without rubbing against the sensor.

However, these various related art assemblies attempt to obtain the circumferential component by providing the coating material having the proper magnetostrictive properties and having a capability of supporting a permanent magnetic moment, i.e., a magnetic coercivity. With the latter, the material could be permanently oriented magnetically via the temporary application of an external magnetic field. Finding a coating material that has both proper magnetostrictive properties and magnetic coercivity properties has proved elusive.

Accordingly, it would be advantageous to provide an assembly that did not require the coating material to have the proper magnetostrictive properties and a capability of supporting a permanent magnetic moment. It would also be advantageous to provide an assembly that could be formed of less expensive materials than those having the properties set forth above.

BRIEF SUMMARY OF THE INVENTION

The subject invention provides an assembly for measuring movement of a shaft and a torque applied thereto. The assembly includes a shaft having first and second ends and being hollow with a sensor mechanism positioned adjacent the shaft to detect a magnetic flux. A magnetic source having two magnetized poles is disposed within the shaft for producing an essentially sinusoidal magnetic field distribution in both a radial and a circumferential direction around the shaft.

The subject invention further provides an assembly for measuring a magnetic flux. The assembly includes the shaft having a magnetostrictive material disposed annularly about and directly on the shaft and extending between first and second edges. A flux collector extends beyond the first and the second edges of the magnetostrictive material to direct the magnetic flux. A sensor measures an axial component of the magnetic flux flowing from the edges of the magnetostrictive material and through the flux collector. A positional ring extends annularly around and spaced from the shaft and a positional sensor is disposed between the positional ring and the shaft for measuring a radial component of the magnetic flux. The magnetic source is disposed within the shaft for continuously producing magnetic flux and rotates with it for detection of the shaft position.

The subject invention overcomes the inadequacies that characterize the related prior art assemblies. Specifically, the subject invention supplies a circumferential magnetic flux even for materials that have negligible coercivity and works well for materials that have significant coercivities. The subject invention allows for assemblies to measure movement of and torque applied to the shaft without requiring the assembly to have certain coercivity and magnetrostrictive material requirements. Therefore, the subject invention has a reduced cost because various materials may be used without impairing the sensing of the movement of the shaft.

BRIEF DESCRIPTION OF THE SEVERAL VIEWS OF THE DRAWING

Other advantages of the present invention will be readily appreciated as the same becomes better understood by reference to the following detailed description when considered in connection with the accompanying drawings wherein.

DETAILED DESCRIPTION OF THE INVENTION

Figure 1:
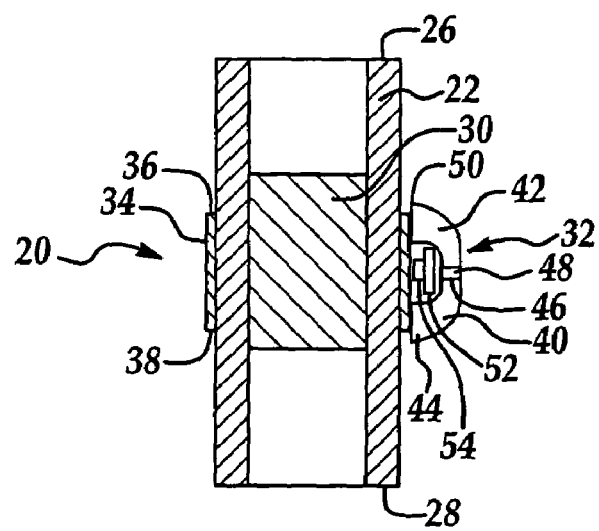
FIG. 1 is a longitudinal cross-sectional view taken along a shaft of an assembly according to the subject invention having a sensor mechanism adjacent the shaft.
Figure 2:
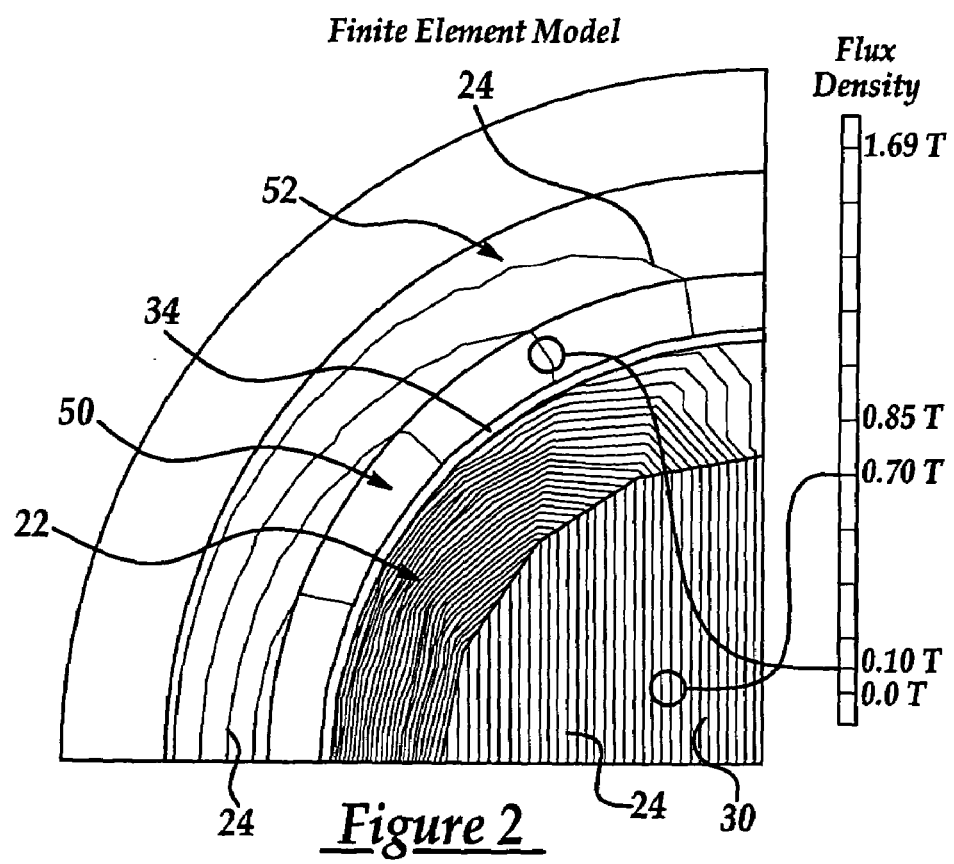
FIG. 2 is a quarter-section finite element model of a magnetic field flowing from a permanent magnet through a steel shaft, a magnetostrictive material on the shaft, an air gap, and a positional ring.

Referring to the Figures, wherein like numerals indicate like or corresponding parts throughout the several views, an assembly for measuring rotational movement of a shaft 22 and for measuring torque applied thereto is generally shown at 20 in FIG. 1. More specifically, as the shaft 22 moves, the assembly 20 measures a magnetic flux flowing through and around the shaft 22. As shown in FIG. 2, magnetic field lines 24 are shown flowing through the assembly 20. The magnetic field lines 24 are illustrated as a flux density through a particular area of the assembly 20 and will be described more fully below. The magnetic flux may be used to detect either rotation or twisting of the shaft 22. Rotating turns the entire shaft 22, while twisting produces a torque as is known by those skilled in the art. The subject invention measures torque and position in a non-compliant fashion. Non-compliant refers to a requirement of a relatively small angle of twist for a given torque, for example, less than 1 degree of twist for a torque of 16 N-m.

Referring back to FIG. 1, the shaft 22 extends between first and second ends 26, 28 and is formed of a magnetic material, a paramagnetic material, or a non-magnetic material. Preferably, the shaft 22 is hollow. One example of a magnetic material capable of use as the shaft 22 is 1020 steel. This particular type of steel is relatively inexpensive and reduces manufacturing costs of the assembly 20. Suitable types of paramagnetic material include, but are not limited to, Nitronic steel and aluminum.

The subject invention includes a magnetic source 30 disposed within the shaft 22. The magnetic source 30 has two poles for producing a parallel magnetic field emanating radially from the shaft 22, as shown in FIG. 2. The magnetic source 30 produces an essentially sinusoidal magnetic field distribution in both a radial and a circumferential direction around the shaft. The radial component extends radially outwardly from the permanent magnet. When the shaft 22 is twisted, the torque induces an axial component of the magnetic flux. The axial component extends axially along the shaft 22 such that the magnetic flux forms closed loops having both the radial component and the axial component. As shown in FIG. 2, the magnetic field strength within the magnetic source 30 is mostly constant at about 0.7 Tesla (T). The magnetic field strength is about 0.1 T just outside the shaft 22 and the magnetic field strength within the shaft 22 varies from 0.1 to 1.7 T depending upon angular position.

Figure 3:
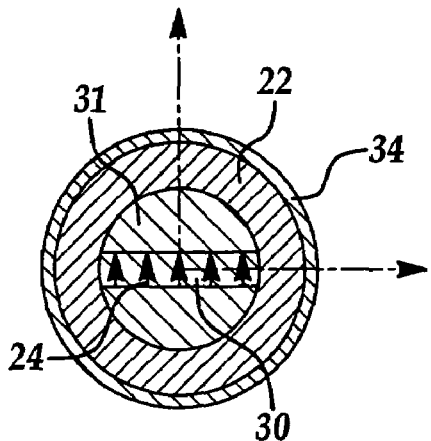
FIG. 3 is a lateral cross-sectional view taken along the shaft of an alternate embodiment of the assembly having the magnetic source as a rectangular magnet.
Figure 4:
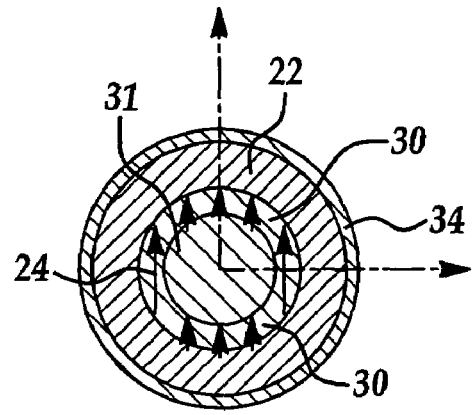
FIG. 4 is a lateral cross-sectional view taken along the shaft of an another embodiment of the assembly having the magnetic source as a ring-shaped magnet.

Preferably, the magnetic source 30 is a magnet, and more preferably a permanent magnet. The magnetic source 30 may be fixed within the shaft 22 by methods known to those skilled in the art. Alternately, the magnetic source 30 may be positioned using its inherent magnetic properties in combination with magnetic shafts 22 or magnetic coatings applied to the shaft 22. Referring to FIG. 1, the magnet 30 is shown as being cylindrically shaped. However, the magnet 30 may also be rectangulary shaped, as in FIG. 3, or ring shaped as shown in FIG. 4. In both FIGS. 3 and 4, a flux carrier 31 is positioned about the magnet 30 to transmit the magnetic flux. It is to be appreciated that the magnetic source 30 may be other shapes so long as it produces a sufficient magnetic field strength.

Figure 5A:
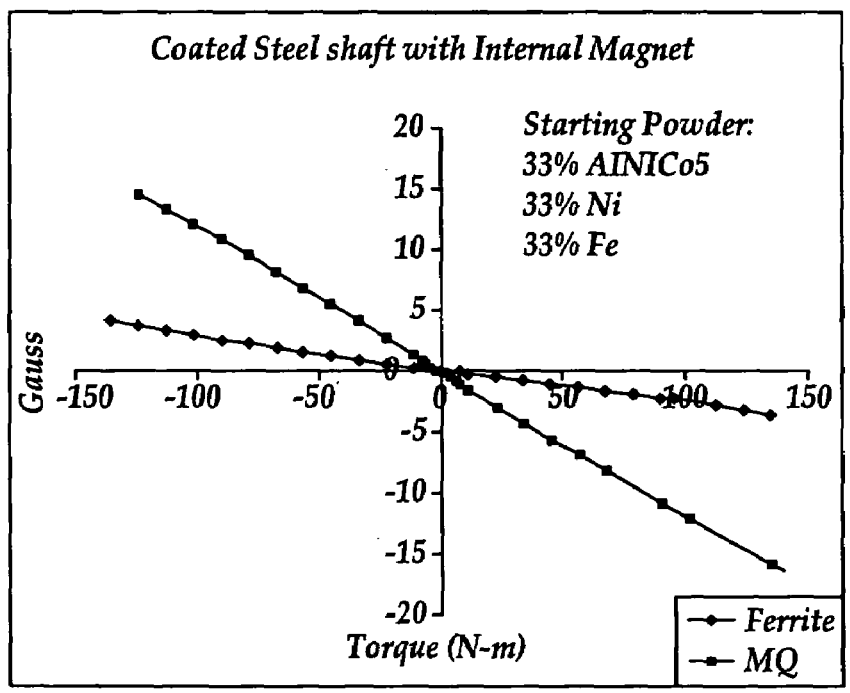
FIG. 5A is a graphical representation of a magnetic field strength versus torque of a shaft formed from 1020 steel and having two different magnetic sources.
Figure 5B:
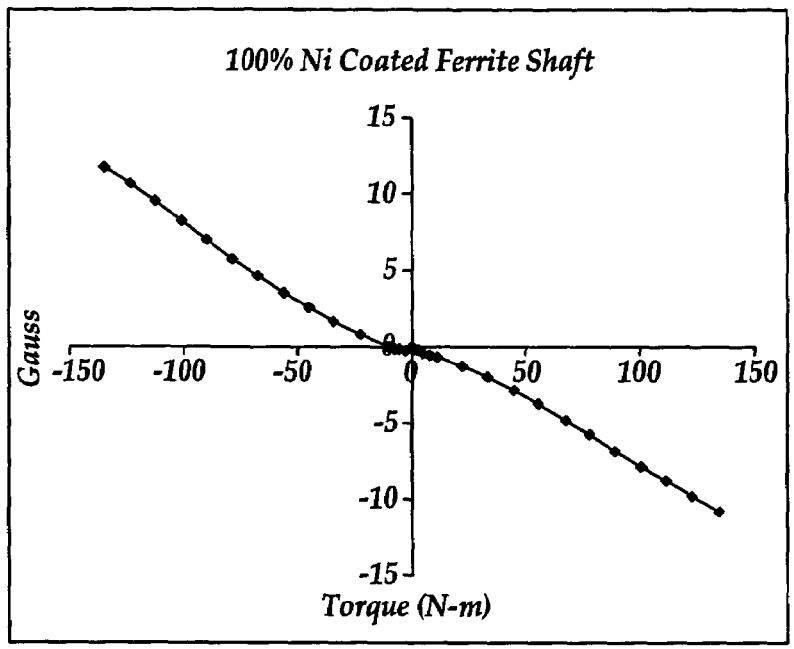
FIG. 5B is a graphical representation of a magnetic field strength versus torque of a shaft formed from Nitronic steel and a ferrite magnet.

Employing the permanent magnet 30 inside the shaft 22 provides the magnetic field large and strong enough to saturate the shaft 22 and any coating materials, thereby allowing relatively inexpensive materials to be used for the shaft 22. However, if a paramagnetic material such as aluminum or Nitronic steel were used for the shaft 22 material, the permanent magnet 30 inside the shaft 22 would increase the torque-induced field, thereby increasing a signal to noise ratio of the assembly 20. The permanent magnet 30 may be a ferrite magnet, a MQ magnet (magnaquench based on NdFeB magnetic compounds) or other magnets. When the MQ magnet 30 is used, a greater initial domain alignment is achieved, i.e., more domains are available to give a resultant axial component of the magnetic flux when a torque is applied. Referring to FIG. 5A, a graphical representation of torque versus measured magnetic field strength in Gauss is shown for a ferrite magnet 30 and a MQ magnet 30. The ferrite magnet 30 inside a 1020 steel shaft 22 produces a line having a smaller slope than that of the MQ magnet 30 in the same shaft 22. For example, applying a torque of about 50 Newton-meters (N-m) to the shaft 22 having the ferrite magnet 30 produces a signal strength of about −0.5 Gauss (G), where the MQ magnet 30 produces a signal of about −5.5 G. As seen in FIG. 5B, the stronger MQ magnet 30 produces a larger signal response for the same torque.

Referring back to FIG. 1, a sensor mechanism 32 is positioned adjacent the shaft 22 to detect the magnetic flux produced in response to the shaft 22 being moved. In one embodiment, the sensor mechanism 32 includes a magnetostrictive (MR) material 34 disposed annularly about the shaft 22 and extends between first and second edges 36, 38. The magnetostrictive material is applied directly to the shaft 22 such that when the shaft 22 is twisted, the torque is transmitted through the magnetostrictive material 34. In other words, when the torque is applied, the magnetic moment of the magnetostrictive coating 34 is altered, such that the magnetic flux includes an axial component flowing through the magnetostrictive material 34. The MR material 34 provides a low reluctance path for the magnetic flux, so that a portion of the return field path is through the MR material 34. In FIG. 5A, the MR material 34 was a mixture of 33% Al—Ni—Co5, 33% Ni, and 33% Fe by volume whereas in FIG. 5B, the material was 100% Ni. It is preferable that the MR material 34 has a permeability similar to that of the shaft 22. The subject invention permits the use of magnetic materials for the shaft 22, which further reduces the cost of the assembly 20.

A flux collector 40 extends beyond the first and second edges 36, 38 of the magnetostrictive material, as shown in FIG. 1. The flux collector 40 may be a continuous material bridging the MR material 34 to collect magnetic flux. However, it is preferred that the flux collector 40 further includes a first half 42 and a second half 44 defining a gap 46 therebetween. A sensor 48 may be disposed within the gap 46 for measuring the axial component of the magnetic flux flowing from the edges 36, 38 of the magnetostrictive material 34. Alternately, the sensor 48 may be a coil (not shown) wrapped around the flux collector 40 or any other field sensing device known to those skilled in the art. Preferably, the sensor 48 is a Hall effect sensor. The flux collector 40 and sensor 48 may be referred generally to as a torque sensor, since the combination is used to determine the torque applied to the shaft.

Figure 6:
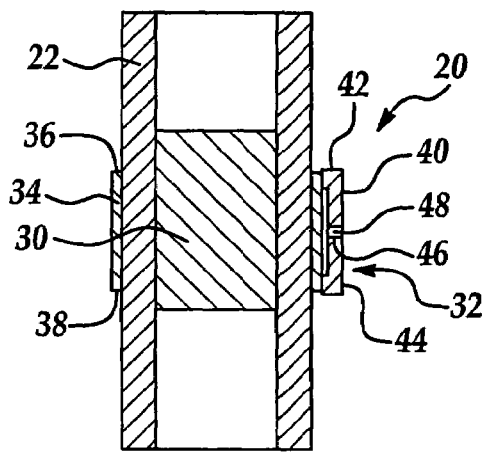
FIG. 6 is a longitudinal cross-sectional view taken along a shaft of still another embodiment of the assembly where the torque sensor is attached to the shaft according to the subject invention
Figure 7:
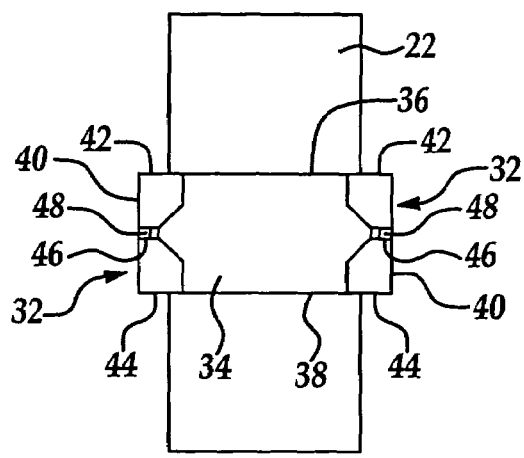
FIG. 7 is side-view of the assembly having a pair of flux collectors, one for redundancy, attached to the shaft.

In one embodiment, shown in FIG. 6, the flux collector 40 may be attached to the shaft 22 to detect the magnetic flux. When the flux collector 40 is attached to the shaft 22, the flux collector 40 moves with the shaft 22. If a redundant system is required, then a pair of the flux collectors 40 are attached to the shaft 22, as illustrated in FIG. 7. In order for the flux collectors 40 to make the necessary measurements, the flux collectors 40 should be spaced 180 degrees from one another. Both sensors are mounted where the circumferential component of flux within the shaft is greatest (90 mechanical degrees from the magnet poles) to maximize the torque response. The redundant system uses the additional flux collector 40 to verify the detection of the magnetic flux. Typically redundant systems are utilized to prevent failure and to ensure optimal performance of the assembly 20.

Figure 8:
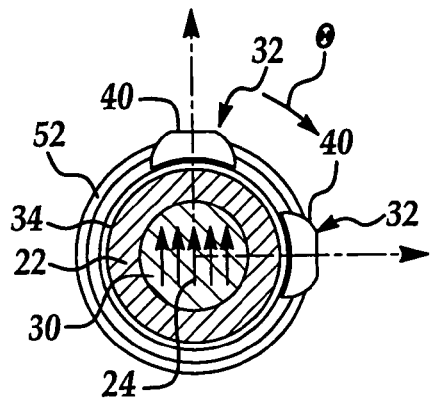
FIG. 8 is a lateral cross-sectional view taken along the shaft of having a pair of flux collectors spaced in magnetic quadrature with a fixed air gap to the shaft.
Figure 9:
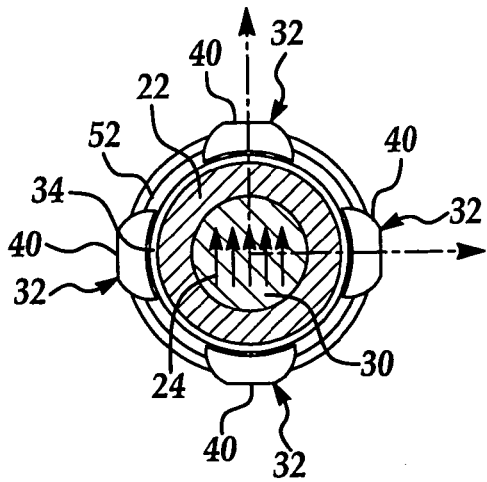
FIG. 9 is a lateral cross-sectional view taken along the shaft of having two pairs of flux, one for redundancy, collectors spaced from the shaft.

Referring to FIG. 8, in another embodiment, a pair of the flux collectors 40 are positioned adjacent the MR material 34. The flux collectors 40 in this embodiment are not in contact with the shaft 22. Spacing the flux collectors 40 from the shaft 22 creates an air gap 50 between the shaft 22 and the flux collectors 40. If the flux collector 40 does not rotate with respect to the shaft 22, at least two flux collectors 40 are required and are spaced 90 degrees apart to measure torque at all positions. Taking the square root of the sum of the squares of the outputs of these sensors 48 yields an output that is independent of position yet proportional to the shaft torque. If three flux collectors 40 are used, then they are spaced 120 degrees from one another. FIG. 9 illustrates a redundant system for these non-contact flux collectors 40 having two pairs of the flux collectors 40 each spaced 90 degrees from one another. However, it is to be appreciated that the flux collectors 40 may be positioned at different angles and still achieve the results of the subject invention by performing additional calculations.

Figure 10:
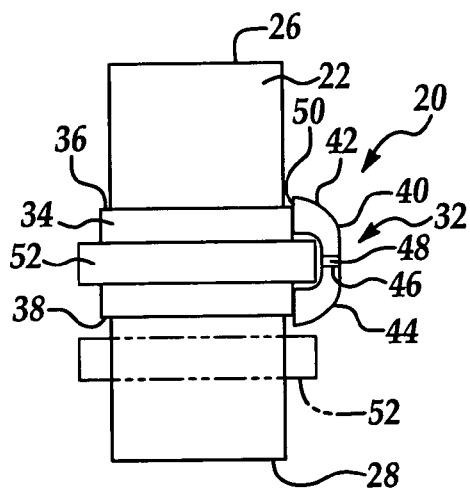
FIG. 10 is a side-view of the assembly having a flux collector spaced from the shaft with a positional flux collector ring positioned between the torque sensor flux collector and the shaft.

The sensor mechanism 32 may also include a positional ring 52 extending annularly around and spaced from the shaft 22. The positional ring 52 is preferably formed of a magnetizable material, but other materials may be used as is known in the art. The shaft 22 is freely rotatable within the positional ring 52. It is preferred that the positional ring 52 be positioned between the edges of the magnetostrictive material. However, the position of the shaft 22 can be determined when the positional ring 52 is positioned elsewhere along the shaft 22, as shown in FIG. 10. The magnetic field produced by the permanent magnet 30 allows for the opportunity to sense position of the shaft 22. The magnetic field produces a sinusoidal wave function when rotated. In order to continue detecting position, the positional ring 52 has to be near the magnetic source 30.

Referring back to FIG. 1, a positional sensor 54 is disposed between the positional ring 52 and the shaft 22 for measuring a radial component of the magnetic flux produced by the magnetic source 30. Locating the positional ring 52 behind the sensors 48 increases the magnetic flux that is detected by the positional sensors 54. The positional ring 52 is preferably a soft magnetic material. In one embodiment, the sensor mechanism 32 includes a pair of the positional sensors 54 spaced 90 degrees from one another. In another embodiment, the sensor mechanism 32 includes two pairs of positional sensors 54 each spaced 90 degrees from one another. The combination of the positional ring 52 and positional sensors 54 may be used to determine rotation of the shaft.

Figure 11:
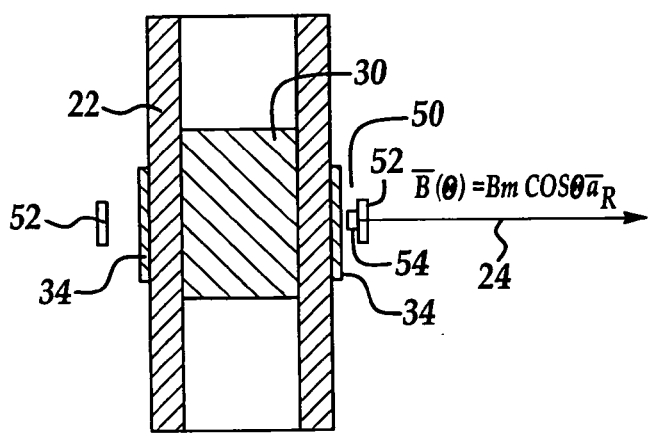
FIG. 11 is cross-sectional view of the assembly having a positional flux collector ring and a positional sensor.

The assembly 20 according to the subject invention is capable of detecting the axial component of the magnetic flux through the flux collector 40 with the sensor 48 and capable of detecting the radial component of the magnetic field through the positional ring 52 with the positional sensors 54. In order to do this, it is preferable that the permanent magnet 30 has two poles and is polarized in a parallel direction to produce the magnetic field in the MR material 34 and shaft 22 that varies predominately in a sinusoidal fashion as a function of angle about the shaft 22. It is also preferable that the magnetic source 30 is maintained within the shaft 22 to continuously induce the bi-directional magnetic flux through the shaft 22. The permanent magnet 30 produces a magnetic flux density through the air gap 50 with a co-sinusoidal distribution, as shown in FIG. 11 and expressed mathematically as follows:

$$\overline{B}(\theta) = B_m \cos\theta \overline{a}_R$$

wherein $B_m$ is the peak radial component of the magnetic flux, $\theta$ is the angular position with respect to the north pole (clockwise), and $a_r$ is a unit vector in the radial direction. A circumferential field component also, exists, but in this case it varies sinusoidally versus angle.

Figure 12:
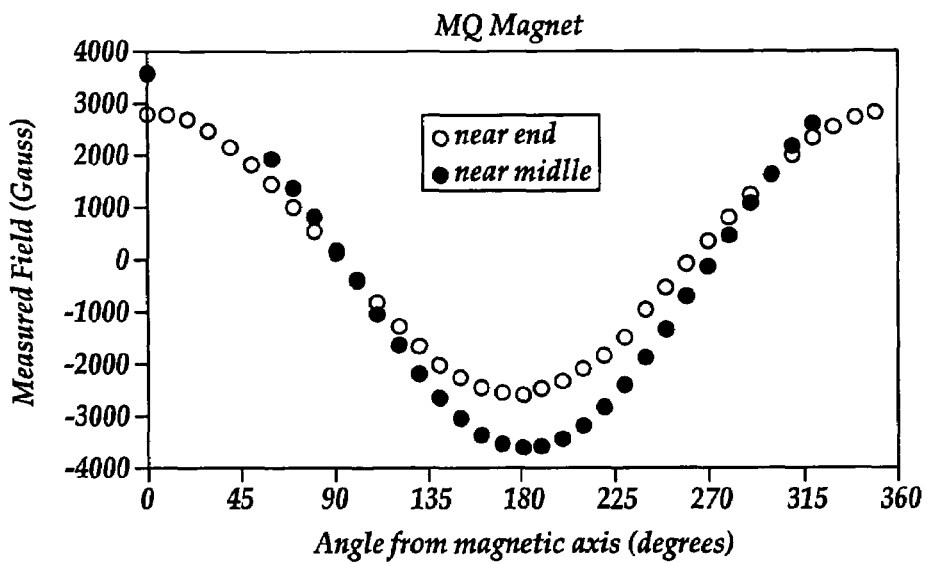
FIG. 12 is a graphical representation of the magnetic field strength for a magnaquench (MQ) magnet based upon angle about the shaft, wherein the strength is measured at the middle of the magnet and near an end of the magnet.

This excitation can be used to magnetize the MR material 34 for use with the flux collector 40 to determine torque and for detecting a position of the shaft 22 as described below. Referring to FIG. 12, the magnetic field strength is shown for a MQ magnet 30 based upon a position about the shaft 22 and at two points along the MQ magnet such that the radial flux is used for position. For both locations along the magnet, at 0 degrees the magnetic field strength is about 3000 G. By placing flux collectors 40 at $\theta=0$ and $\theta=90$, the following equation can be used to determine the signal strength at each position, respectively:

$$V_{\theta=0}(\theta) = k_s B_m \cos\theta$$

for a sensor 48 located at 0 degrees and $$V_{\theta=90}(\theta) = k_s B_m \sin\theta$$

for a sensor 48 located at 90 degrees wherein V is the sensor 48 output in volts and $k_s$ is a constant based upon a calibration of the sensors 48. These signals are typical of a position resolver output and any number of well-known techniques can be used to extract position.

Figure 13:
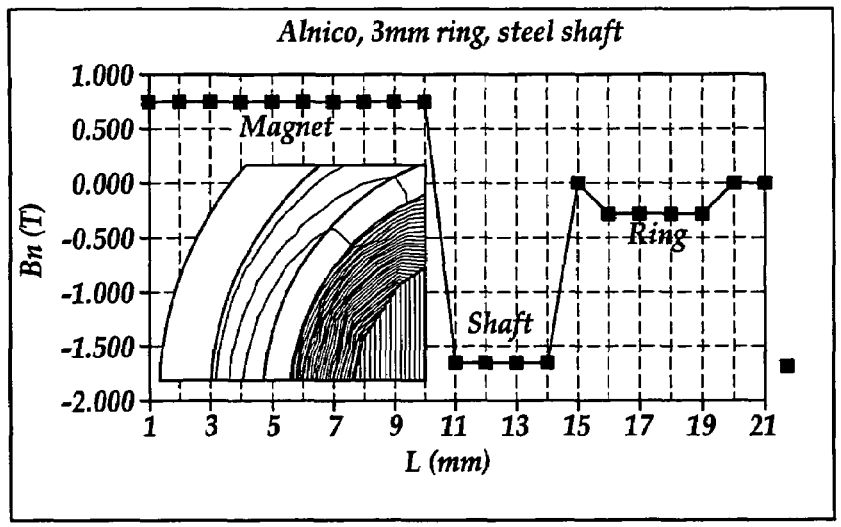
FIG. 13 is a graphical representation of the magnetic flux density based upon a distance from a center of the magnet.
Figure 14:
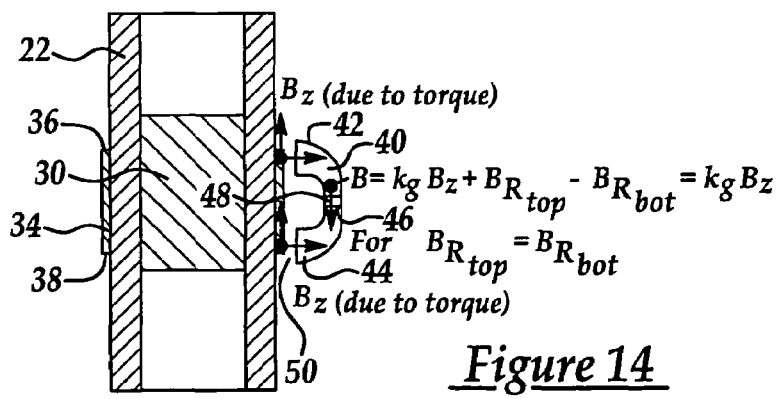
FIG. 14 is a cross-sectional view of the torque sensor assembly for measuring the axial component of the magnetic flux produced by the shaft coating in response to a torque on the shaft.

When the shaft 22 is torqued, the circumferential magnetic flux, $B_\theta$, in the magnetostrictive material 34 produces the axial component of the magnetic flux whose polarity depends on the direction, or sign, of the applied torque. FIG. 13 illustrates the flux density based upon a distance from the center of an Alnico magnet 30 through a steel shaft 22 and into a 3 mm thick positional ring 52. Since the magnitude of the circumferential magnetic flux in the MR material 34 varies in a substantially sinusoidal manner due to the internal magnet, the resultant axial component will also vary in a substantially sinusoidal manner. FIG. 14 illustrates an axial component of the magnetic flux and a radial component of the magnetic flux. The following equations can be used to determine the axial component of the magnetic flux and the applied torque:

$$B_z(\theta) = B_{torque}(\text{Mag}(B_\theta), \text{torque}) \sin\theta$$

wherein Bz is a magnetic flux density in the Z-direction, i.e., axial direction. Measurement of the torque on the shaft requires at least one sensor for the configuration shown in FIG. 6 and at least two sensors for the configuration shown in FIG. 8. For example, in FIG. 8 with one torque sensor at $\theta=0$ and one at $\theta=90$, the torque is given by the following equation:

$$\text{Torque} = k_t \sqrt{(k_g)^2 B_{torque}^2 (\sin^2\theta + \cos^2\theta)} = k_g k_t B_{torque}$$

wherein $k_t$ is a proportionality constant, $k_g$ is a constant based upon the geometry and materials used for the flux collectors 40 and sensors 48 and the air gap 50.

Specifically, magnetic moments within the coating 34 are oriented magnetically by the magnet 30. The applied torque then produces the axial component and it is the axial component which is sensed as a signal corresponding to the applied torque. The magnetic moments in the coating 34, which are oriented by the magnet 30 at zero torque are rotated slightly by the applied torque to produce this axial component. The magnitude of the axial component of the magnetic flux produced by the torque depends on the strength of the magnet 30, the state of stress within the coating 34, and on the magnetostrictive properties of the coating 34. The above equations can be used to determine the amount of torque applied to the shaft 22 based upon the detected magnetic flux and magnetic field strength.

The axial component of the magnetic flux density depends on the composition and the dimensions of the coating 34 and the applied torque on the shaft 22. The influence of the varying circumferential magnetization is accounted for by the $\sin\theta$ term in the above equations. This axial component of magnetic flux will form two closed loops, one entering the shaft 22 while the other is external to the shaft 22 and coating 34. The later component of the magnetic flux can be detected using the flux collector 40 for sensing torque applied to the shaft. The flux collector 40 rejects the common mode radial field of the magnet, yet they are sensitive to the outer loop of flux produced by the axial component of the magnetic flux from the torqued shaft.

Obviously, many modifications and variations of the present invention are possible in light of the above teachings. The invention may be practiced otherwise than as specifically described within the scope of the appended claims.

What is claimed is:

1. An assembly for measuring movement of and torque applied to a shaft, the shaft having first and second ends and being hollow, said assembly comprising:
   a sensor mechanism positioned adjacent said shaft to detect a magnetic flux; and
   a magnetic source having two magnetized poles disposed within said shaft for producing an essentially sinusoidal magnetic field distribution in both a radial and a circumferential direction around said shaft.

2. An assembly as set forth in claim 1 wherein said magnetic source is further defined as a magnet.

3. An assembly as set forth in claim 2 wherein said magnet is further defined as a permanent magnet.

4. An assembly as set forth in claim 1 wherein said sensor mechanism further includes a magnetostrictive material disposed annularly about said shaft and extending between first and second edges.

5. An assembly as set forth in claim 4 wherein said magnetostrictive material is applied directly to said shaft.

6. An assembly as set forth in claim 4 wherein said sensor mechanism further includes a flux collector extending beyond said first and second edges of said magnetostrictive material.

7. An assembly as set forth in claim 6 wherein said flux collector further includes a first half and a second half defining a gap therebetween.

8. An assembly as set forth in claim 7 wherein said sensor mechanism further includes a sensor disposed within said gap for measuring an axial component of the magnetic flux flowing from said edges of said magnetostrictive material.

9. An assembly as set forth in claim 8 wherein said flux collector is further defined as being attached to the shaft.

10. An assembly as set forth in claim 9 further including a pair of said flux collectors.

11. An assembly as set forth in claim 10 wherein said flux collectors are spaced 180 degrees from one another.

12. An assembly as set forth in claim 8 further including a pair of said flux collectors 13. An assembly as set forth in claim 12 wherein said flux collectors are spaced 90 degrees from one another.

14. An assembly as set forth in claim 12 further including two pairs of said flux collectors.

15. An assembly as set forth in claim 14 wherein each of said flux collectors are spaced 90 degrees from one another.

16. An assembly as set forth in claim 8 wherein said sensor is further defined as a Hall effect sensor.

17. An assembly as set forth in claim 1 wherein said sensor mechanism further includes a positional ring extending annularly around and spaced from said shaft.

18. An assembly as set forth in claim 17 wherein said positional ring is formed of a magnetizable material.

19. An assembly as set forth in claim 17 wherein said sensor mechanism further includes a positional sensor disposed between said positional ring and said shaft for measuring a radial component of the magnetic flux produced by said magnetic source.

20. An assembly as set forth in claim 19 wherein said sensor mechanism further includes a pair of said positional sensors.

21. An assembly as set forth in claim 20 wherein said positional sensors are spaced 90 degrees from one another.

22. An assembly as set forth in claim 20 wherein said sensor mechanism further includes two pairs of positional sensors.

23. An assembly as set forth in claim 22 wherein each of said positional sensors are spaced 90 degrees from one another.

24. An assembly as set forth in claim 20 wherein said shaft is rotatable within said positional ring.

25. An assembly for measuring a magnetic flux, said assembly comprising:
   a shaft having first and second ends and being hollow;
   a magnetostrictive material disposed annularly about and directly on said shaft and extending between first and second edges;
   a flux collector having a first half and a second half defining a gap therebetween and extending beyond said first and said second edges of said magnetostrictive material;
   a sensor disposed within said gap for measuring an axial component of the magnetic flux flowing from said edges of said magnetostrictive material;
   a positional ring extending annularly around and spaced from said shaft;
   a positional sensor disposed between said positional ring and said shaft for measuring a radial component of the magnetic flux; and
   a magnetic source disposed within said shaft for producing magnetic flux about said shaft.

26. An assembly as set forth in claim 25 wherein said magnetic source is further defined as a magnet.

27. An assembly as set forth in claim 26 wherein said magnet is further defined as a permanent magnet.

28. An assembly as set forth in claim 27 wherein said flux collector is further defined as being attached to said shaft.

29. An assembly as set forth in claim 28 further including a pair of said flux collectors.

30. An assembly as set forth in claim 29 wherein said flux collectors are spaced 180 degrees from one another.

31. An assembly as set forth in claim 27 further including a pair of said flux collectors.

32. An assembly as set forth in claim 31 wherein said flux collectors are spaced 90 degrees from one another.

33. An assembly as set forth in claim 32 further including two pairs of said flux collectors.

34. An assembly as set forth in claim 33 wherein each of said flux collectors are spaced 90 degrees from one another.

35. An assembly as set forth in claim 34 wherein said sensor is further defined as a Hall effect sensor.

36. An assembly as set forth in claim 25 wherein said positional ring is formed of a magnetizable material.

37. An assembly as set forth in claim 25 further including a pair of said positional sensors.

38. An assembly as set forth in claim 37 wherein said positional sensors are spaced 90 degrees from one another.

39. An assembly as set forth in claim 37 further including two pairs of positional sensors.

40. An assembly as set forth in claim 39 wherein each of said positional sensors are spaced 90 degrees from one another.

41. An assembly as set forth in claim 25 wherein said shaft is rotatable within said positional ring.

42. An assembly as set forth in claim 25 wherein said positional ring is positioned between said edges of said magnetostrictive material.

43. A method of measuring a magnetic flux flowing through and around a shaft having first and second ends and being hollow, said method comprising the steps of:
   providing the shaft with a magnetostrictive material disposed annularly about and directly on the shaft and extending between first and second edges;
   positioning a flux collector having a first half and a second half defining a gap therebetween and extending beyond the first and the second edges of the magnetostrictive material adjacent the magnetostrictive material;
   disposing a sensor within the gap for measuring an axial component of the magnetic flux flowing from the edges of the magnetostrictive material positioning a positional ring annularly around and spaced from the shaft;
   disposing a positional sensor between the positional ring and the shaft for measuring a radial component of the magnetic flux; and
   disposing a magnetic source within the shaft for producing the magnetic flux for detection about the shaft.

44. A method as set forth in claim 43 further including the step of detecting an axial component of a magnetic flux through the flux collector with the sensor.

45. A method as set forth in claim 43 further including the step of detecting a radial component of the magnetic field through the positional ring with the positional sensors.

46. A method for measuring movement of a shaft having first and second ends and being hollow, said method comprising the steps of:
   positioning a sensor mechanism adjacent the shaft to detect a magnetic flux;
   disposing a magnetic source having two poles within the shaft for producing a parallel magnetic field emanating radially from said shaft; and
   maintaining the magnetic source within the shaft to continuously induce a bi-directional magnetic flux through the shaft.

47. A method as set forth in claim 46 further including the step of detecting an axial component of a magnetic flux through the sensor mechanism.

48. A method as set forth in claim 46 further including the step of detecting a radial component of the magnetic field through the sensor mechanism.

* * * * *